United States Patent [19]

Berry

[11] Patent Number: 5,547,035
[45] Date of Patent: Aug. 20, 1996

[54] POWERED HAND TRUCK

[76] Inventor: Blane P. Berry, 108 Glen Rd. S., Rome, N.Y. 13440

[21] Appl. No.: 377,969

[22] Filed: Jan. 25, 1995

[51] Int. Cl.$^6$ ............... B62D 51/04; B62D 51/02; B60G 23/00
[52] U.S. Cl. ............... 180/19.2; 180/11; 280/111; 280/109; 254/3 R
[58] Field of Search ............... 180/19.1, 19.2, 180/19.3, 11; 280/111, 109; 254/3 R

[56] References Cited

U.S. PATENT DOCUMENTS

| | | | |
|---|---|---|---|
| 2,377,389 | 6/1945 | Waters | 180/11 X |
| 2,812,824 | 11/1957 | Adams | 180/19.2 |
| 3,205,963 | 9/1965 | Tinker | 180/11 X |
| 3,485,314 | 12/1969 | Herr | 180/19.1 |
| 3,735,831 | 5/1973 | Gray | 180/19.1 |
| 3,939,999 | 2/1976 | Nielson | 280/47.27 X |
| 4,429,758 | 2/1984 | Meshulam | 180/19.3 |
| 4,798,255 | 1/1989 | Wu | 280/111 X |
| 4,811,988 | 3/1989 | Immel | 180/19.1 X |
| 4,848,504 | 7/1989 | Olson | 180/19.1 |
| 5,147,170 | 9/1992 | Detrick | 180/19.1 X |
| 5,284,218 | 2/1994 | Rusher, Jr. | 180/19.1 |

Primary Examiner—Eric D. Culbreth
Assistant Examiner—F. Zeender
Attorney, Agent, or Firm—Robert O. Wright

[57] ABSTRACT

A four wheeled powered hand truck for transporting logs in confined spaces over rough and inclined terrain is shown. A hand fork assembly is pivotally mounted on the front end of the powered hand truck adapted to move from a vertical load/unload position to a reclined load carrying position. A gasoline engine, transmission, clutch, differential, safety latch and controls are shown.

13 Claims, 3 Drawing Sheets

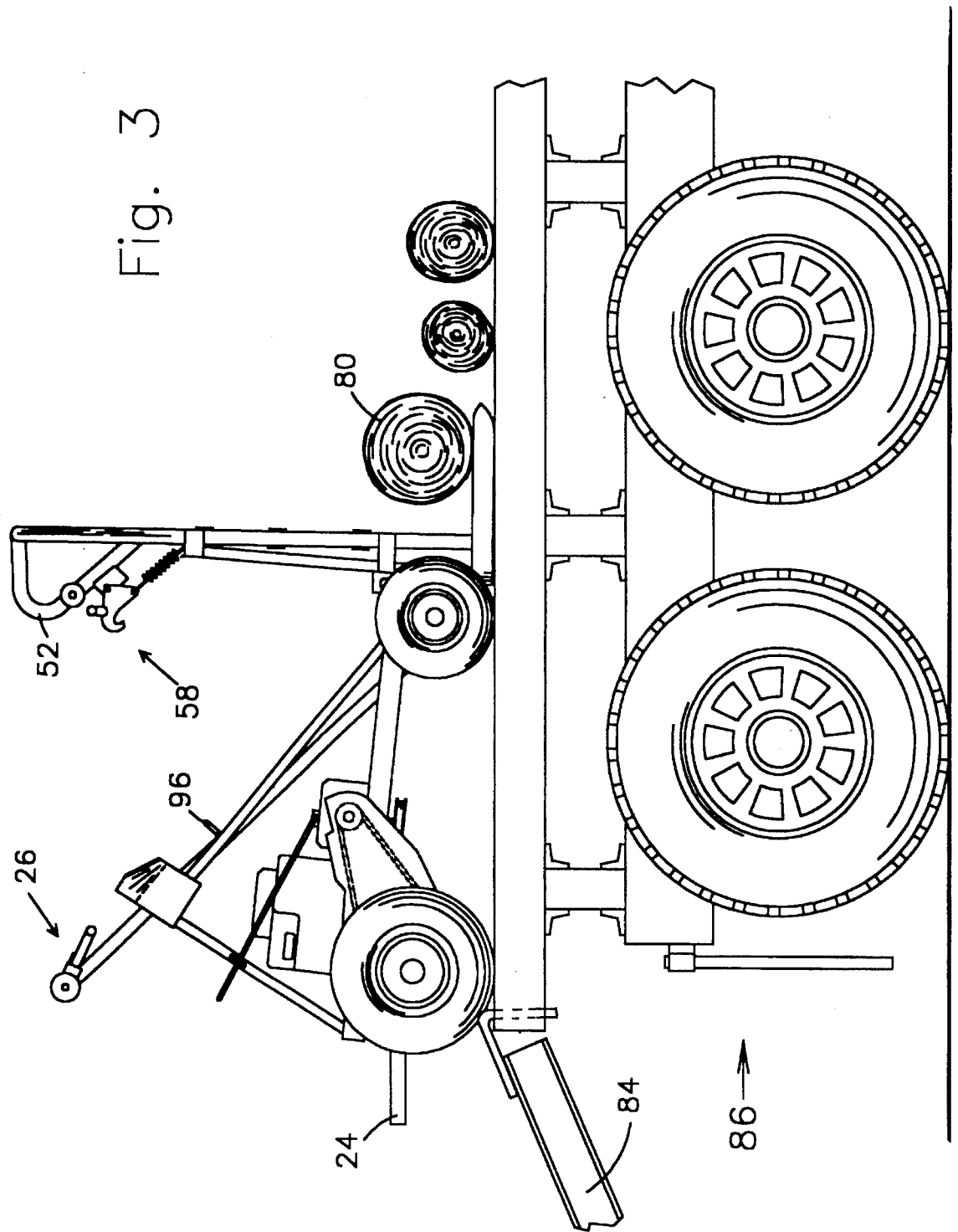

POWERED HAND TRUCK

This invention relates to a powered hand truck and more particularly to a gasoline engine powered hand truck for transporting logs and other bulky items over rough terrain and into a truck or other enclosure for storage or further disposition.

BACKGROUND OF INVENTION

In the tree removal business it is frequently necessary to cut down and remove large trees from inaccessible and confined locations. Limbs, some of which may be very large, and the tree itself must be taken down and removed with minimum damage to the surroundings such as adjacent buildings and lawn. The trees are taken down piece by piece and the branches and tree cut into suitable lengths and size for easy handling and removal. Frequently, however, the location of the tree is such that a dump truck or other large vehicle can not be driven next to the tree.

Heretofore it has been necessary to manually carry the tree, log by log, from the inaccessible tree location to the truck for hauling away. Construction type wheel barrows have proven very inefficient in that the size and quantity of logs that can be transported is limited. Lawn carts and the like similarly can not handle enough of a load to be practical. Neither when loaded can be readily pushed up an incline, over a lawn or into a truck for removal. Conventional hand trucks have proven equally unsatisfactory for this application.

OBJECTS AND SUMMARY OF INVENTION

Accordingly it is an object of the present invention to provide a powered hand truck that overcomes the limitations of the prior art.

It is another object of the present invention to provide a powered hand truck that will safely and efficiently transport a number of heavy logs over rough and inclined terrain.

It is another object of the present invention to provide a powered hand truck that can handle heavy loads of logs and the like in confined spaces without damage to the surrounding terrain and adjacent structures.

It is a further object of the present invention to provide a powered hand truck that is easily loaded and unloaded.

It is a further object of the present invention to provide a powered hand truck that can move heavy and bulky loads in confined spaces over rough terrain.

It is yet another object of the present invention to provide a powered hand truck that can move heavy and bulky loads up steep inclines.

It is a still further object of the present invention to provide a powered hand truck which can transport the operator along with heavy and bulky loads over rough terrain.

These and other and further objects are accomplished in one embodiment of the invention in which a gasoline motor powered four wheel cart has a hand fork assembly pivotally mounted on the front end and adapted to move from a vertical load/unload position to a load carrying position inclined forty to sixty degrees from the vertical.

BRIEF DESCRIPTION OF THE DRAWINGS

FIG. 3 is a side view of the hand truck according to the present invention with the hand fork assembly in the unload position.

DESCRIPTION OF PREFERRED EMBODIMENT

Figure 1:
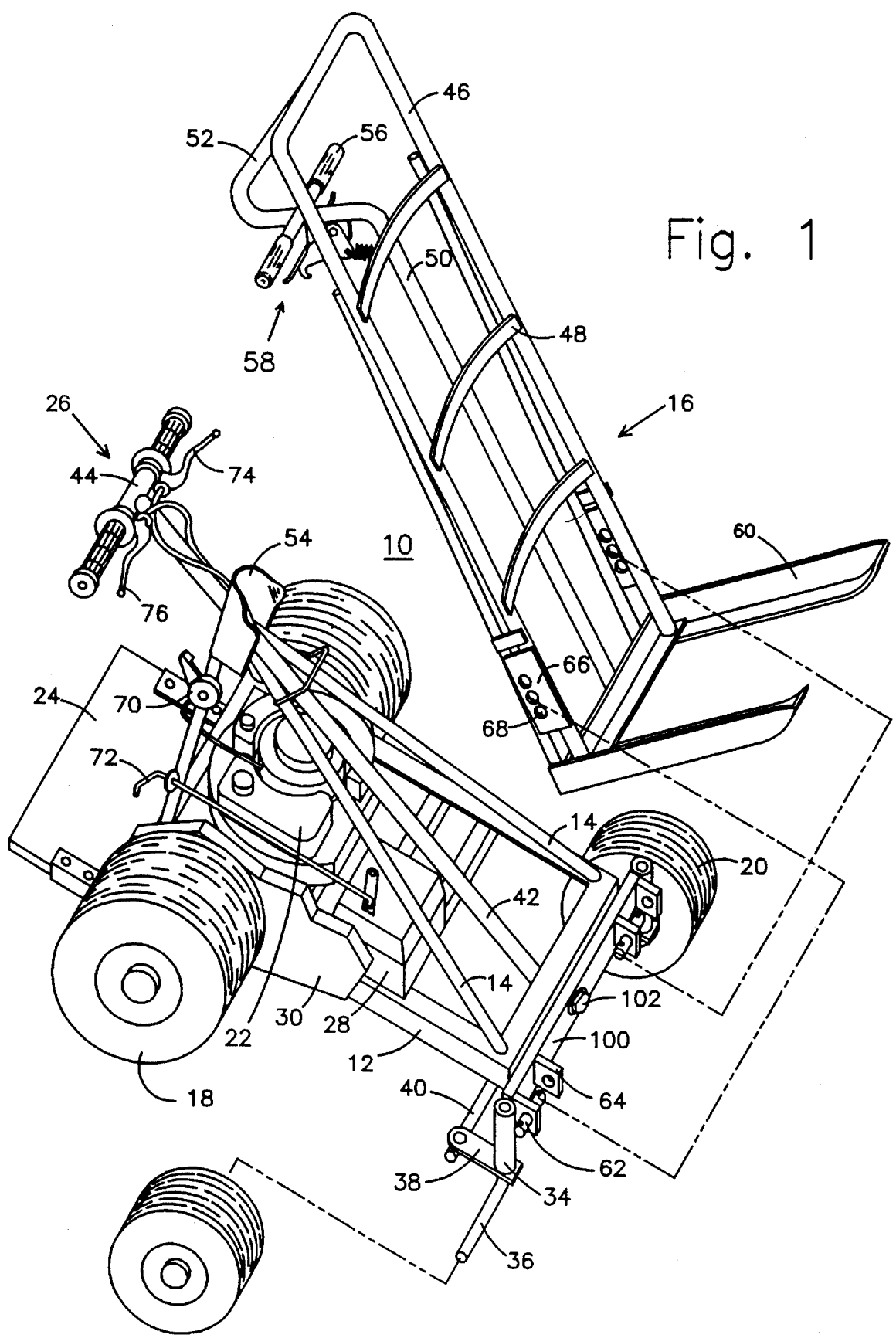
FIG. 1 is an exploded perspective view of the powered hand truck of the present invention.

Referring now to FIG. 1, the powered hand truck 10 includes a wheeled cart member which has a lower generally rectangular frame 12, a pair of triangular upper frame members 14, a pair of drive wheels 18 mounted at the rear of frame 12, a pair of steerable front wheels 20 pivotably mounted on the front of frame 12, a gasoline motor 22 mounted on frame 12, an operator platform 24, and a steering and control assembly 26 and a load carrying frame member designated as hand fork assembly 16.

In a preferred embodiment frame 12 has a pair of longitudinal angle iron members joined at spaced intervals by a series of transverse angle iron members. The angle iron members are typically welded to each other and the transverse members spaced to provide support for the engine 22, transmission 28, chain drive 30, clutch assembly(not shown), and the wheels 18 and 20. Triangular upper frame members 14 are formed from lengths of tubing welded to the front and rear corners of frame 12 and joined together at the apexes above the motor 22 to form a skewed pyramid like structure above the base frame 12.

The front wheels are rotatably mounted on stub shafts 36 which are pivotally mounted in tubes 34 which are welded to axle bar 100. Arms 38 are fixed to the stub shafts and serve with tie rod 40 to allow the front wheels to be steered. Steering shaft 42 is rotatably mounted in upper frame 14 and has at the upper end handle bar 44 and at the lower end is operatively connected to tie rod 40 through the usual instant center linkage steering assembly (not shown) so that rotary movement thereof will turn wheels 20.

Figure 2:
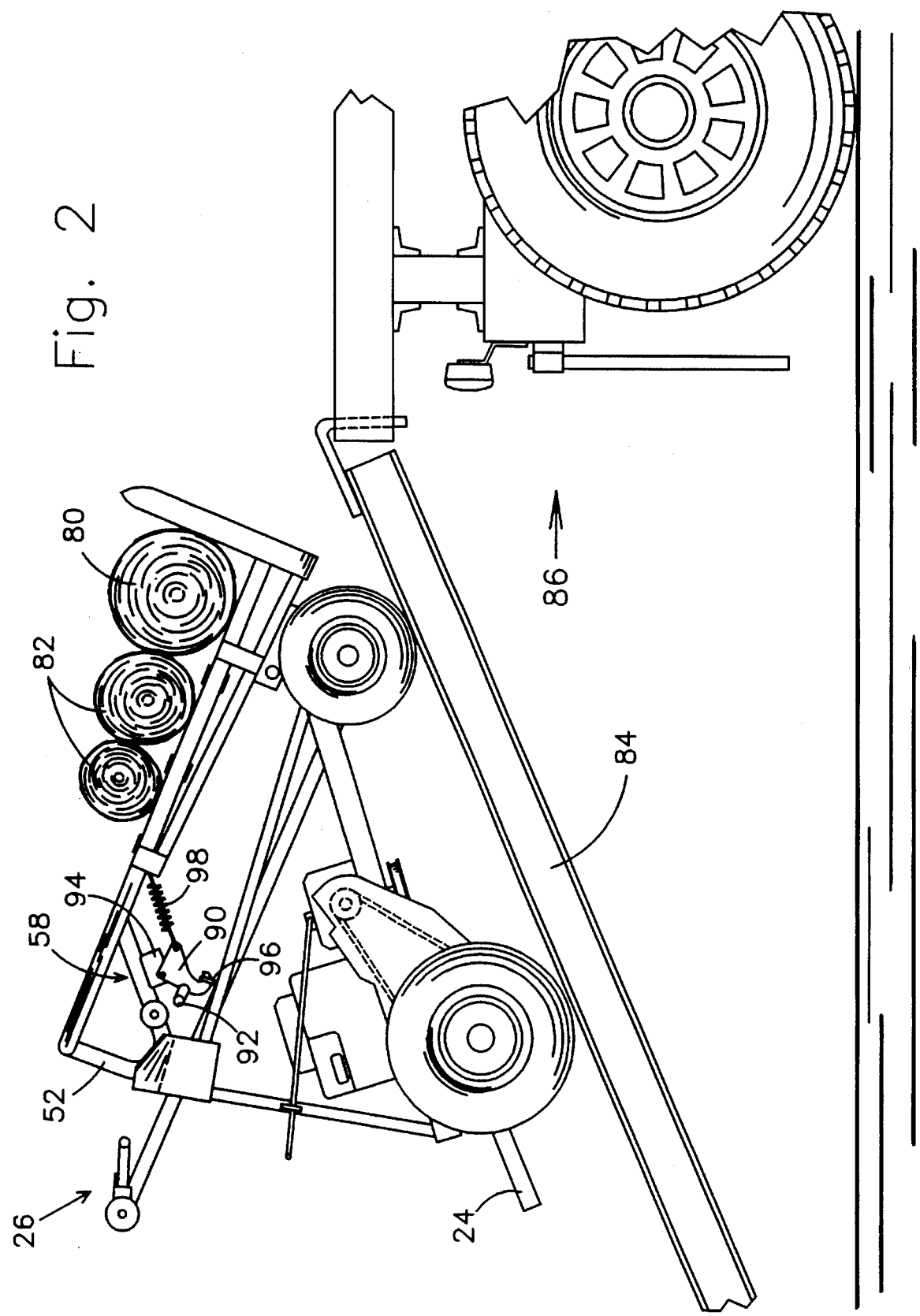
FIG. 2 is a side view of the hand truck according to the invention carrying a load of logs up an inclined ramp into a truck.

Hand fork assembly 16 has an elongated body or mast section 46 shown formed from a U shaped tube with three transverse curved bars 48 welded at spaced intervals therealong. A stiffening tube 50 with a depending foot portion 52 at the upper end is welded in the center of the U shaped mast 46. Foot portion 52 nests in recepticle 54 fixed on frame 14 and has mounted thereon handle 56 and latch mechanism 58. Forks 60 are welded to the bottom of the U shaped mast section 46 and extend out perpendicular thereto to form a load carrying base member for the logs as shown in FIGS. 2 and 3.

The mast 46 and forks 60 are pivotally mounted about pins 62 for fore and aft movement relative to frame 12. Pins 62 are positioned in brackets 64 which are welded to axle bar 100. Pins 62 are inserted through one of three holes 68 in plates 66 which are welded to the tube 46 adjacent to the junction of the tube 46 and forks 60. The plates 66 are located so as to allow the forks 60 to rest on the ground in the load/unload position and yet provide ample clearance over uneven terrain when the cart is transporting a load of logs with the assembly 16 in the carrying position.

Axle bar 100 is pivotally mounted on frame 12 about pin 102. The bar 100 thus may pivot from side to side which allows the wheels 20 to adjust up and down as the truck 10 passes over small hills and valleys in the terrain. Since the hand fork assembly 16 is mounted on axle bar 100 it will pivot side to side with the front wheels 20 which will lift the logs carried bon the forks 60 over the small hills in the terrain rather than dump the load or hang up the powered hand truck. Suitable clearance is provided for this movement in the latching mechanism 54 and 58.

A throttle control 70 is mounted on one side of frame 14 at the rear so as to be readily accessible to the operator. Gear shift lever 72 is also mounted on the frame 14 and extends from the transmission 28 rearward to the operator position. Clutch lever 74 and brake lever 76 are mounted on handlebar 44 so the operator can control the powered truck while steering the truck over the desired path. The clutch, brake and throttle levers are operatively connected to their respective components by conventional flexible wire actuators.

As may be seen in FIGS. 2 and 3 the fork assembly 16 is mounted so as to allow easy loading and unloading of logs while at the same time positioning the load far enough back over all four wheels to attain good traction and vehicle footprint in load carrying position. It will be seen that in the load carrying position of hand fork assembly 16 the center of gravity of the loaded truck 10 is well within the frame 12 perimeter and the four load bearing wheels. This makes for a very stable powered hand truck capable of traversing rough and inclined terrain in a safe and efficient manner.

As may be seen in FIG. 3 the forks may sometimes be inserted under a log 80 for loading. Very heavy and large logs may also be rolled onto forks 60 for transportation eliminating difficult and dangerous manual handling. Also several smaller logs 82 may be piled on top of log 80 along mast 46 of fork truck assembly 16. The limit on the number of logs that may be carried is determined by the length of forks 60, mast 46, and the angle of mast 46 relative to the vertical in the load carrying position.

The angle of the load carrying position of fork assembly 16 is chosen between forty and sixty degrees from the vertical when on a horizontal surface so as to keep the load in place when on the level and yet not permit the load to shift backward onto the operator when the hand truck is ascending an incline. This is particularly important when driving a load up a ramp 84 into an over the road truck 86 as shown in FIG. 2. In the preferred embodiment shown the angle is forty five degrees.

Latch mechanism 58 as may be seen more clearly in FIG. 2 has a hook plate 90 pivotally mounted on plate 94 which is welded to foot 52. Hook plate 90 engages in a bail 96 fixed on frame 14 and is urged into engagement therewith by spring 98. A handle 92 is provided to release the latch mechanism when desired.

The rear drive wheels are generally larger in diameter end width than the front steering wheels. Wheels 18 and 20 are chosen to have the desired load carrying rating. For instance with a pair of 16×6&½ rear and 11×4 front wheels loads of up to 600 pounds can be easily handled. Other size tires and wheels can be substituted for different load and/or terrain conditions.

In a preferred embodiment the engine 22 is a 4 hp gasoline engine which at 2800 rpm generates approximately 90 in-# of torque at the output shaft. With a ramp incline of 20 degrees and a gross weight of 600 # some 3200 in-# of torque will be required at the wheel axles to move the load up the ramp. A transmission reduction ratio of 50:1 results in a truck speed up the ramp of approximately one foot per second without exceeding the capacity of the motor. On level ground where lifting of the load is eliminated the torque to move the truck is reduced so that a 10:1 reduction ratio will yield a speed of eight to ten feet per second. Transmission reduction ratios of 30–70:1 for ramp use and 5–10:1 for level ground have been found acceptable.

Obviously these values will vary depending on wheel size, engine rpm/hp/torque, load size, and terrain incline. However, the combination of a light weight, low power, flexible, powered hand truck capable of operation over rough and inclined terrain with bulky, awkward loads was unknown in the industry heretofore. The device shown and described is economical to manufacture and operate. It can be powered by a variety of power plants such as natural gas and propane instead of gasoline and can be easily tailored to specific job requirements.

Platform 24 is welded to the back of frame 12 and extends far enough out to permit an operator to stand thereon and manipulate the steering and other controls of the powered hand truck while transporting a load of logs. Also under certain load conditions the extra weight of the operator may actually improve traction. At other times, if desired, the operator merely walks along beside the truck and can still reach all the necessary controls to safely maneuver the truck.

Transmission 28 is provided with at least two forward and one reverse positions so that the powered hand truck engine may provide the desired low speed up hill performance such as required in FIG. 2 and a faster level ground speed for transit from tree to removal site. Additional speeds both forward and reverse may be provided as desired. Hydrostatic and other types of transmissions may be used equally well within the scope of the present invention.

With the low speed transmission 28 and the reclining load carrying fork assembly 16 powered hand truck 10 may be used to move heavy loads safely up a steep incline without danger of tipping over backwards or spilling the load such as may occur with conventional powered lift trucks. Hand trucks are also very unsatisfactory for this task since the lifting required of the operator is very great and footing is usually very poor. The powered hand cart 10 of the present invention overcomes the shortcomings of these prior art devices in an efficient and economical manner, in addition to its rough terrain and confined space capabilities previously discussed. As shown in FIG. 2 an operator using truck 10 may "walk" a heavy load up a steep ramp into a truck or storage/disposal area safely and easily.

In operation the powered hand truck 10 is positioned adjacent the cut up logs to be removed and the fork assembly 16 positioned as shown in FIG. 3. Logs 80–82 are rolled or otherwise placed on the forks 60 and the mast 46 reclined to the position of FIG. 2 by grasping handle 56 and pulling it back toward the operator position until latch plate 90 engages in bail 96 to secure the fork truck assembly in the load carrying position. The operator will then start the engine 22, set the throttle 70 and transmission 28 in the desired positions, release brake lever 76 and engage clutch lever 74 to start the powered hand cart moving. At the same time the operator will steer the powered hand truck 10 with handlebar 44 to guide it over the desired path.

The powered hand truck has been shown and described for the transport of logs, however, it will be apparent that other bulky and hard to handle items could be easily handled. The forks 60 could readily be replaced with other appendages suited to a particular item such as bags of fertilizer, baled trees or shrubs, and other herd to transport items.

While there are given above certain specific examples of this invention and its application in practical use, it should be understood that they are not intended to be exhaustive or to be limiting of the invention. On the contrary, these illustrations and explanations herein are given in order to acquaint others skilled in the art with this invention and the principles thereof and a suitable manner of its application on practical use, so that others skilled in the art may be enabled to modify the invention and to adapt and apply it in numerous forms each as may be best suited to the requirements of a particular use.

What is claimed is:

1. A powered hand truck for transporting tree limbs, logs and other bulky, heavy loads over rough and inclined terrain which comprises in combination:

a wheeled cart member having a generally rectangular frame and first and second pairs of wheels supporting the front and rear ends respectively of said cart member frame;

an axle bar member pivotally mounted on the front end of said frame for movement about an horizontal axis;

said first pair of wheels being individually mounted at the opposite ends of said axle bar for rotation about an horizontal axis and for pivotal steering motion about a vertical axis to facilitate turning of said cart member;

said second pair of wheels serving as drive wheels for said cart member;

motive power means operatively connected to said second pair of wheels;

steering handle means rotatably mounted on said frame and operatively connected to said first pair of wheels for steering said hand truck;

load carrying means having an upwardly inclined mast section and a fork portion mounted at the lower end of said mast section so as to extend substantially perpendicular thereto;

said load carrying means being pivotally mounted on said axle bar adjacent the junction of said mast section and fork portion for pivotable movement from a load carrying position to a load/unload position and side to side pivotal movement with said axle bar; and control means mounted on said frame for controlling the operation of said motive power means and cart member;

whereby said first pair of wheels and said load carrying means can pivot from side to side so as to clear the terrain when said hand truck is maneuvered over rough and inclined terrain.

2. A hand truck as claimed in claim 1 wherein said driven wheels are larger than said steerable wheels.

3. A hand truck as claimed in claim 2 wherein said motive means includes a gasoline engine mounted adjacent the rear end of said wheeled cart member and a transmission having at least one low speed forward position and one reverse position.

4. A hand truck as claimed in claim 3 further including a handle portion formed on an end of said mast section opposite the end with said fork portion; and a latch mechanism mounted on said wheeled cart member so as to operatively engage said handle portion to selectively secure said load carrying frame member in the load carrying position.

5. A hand truck as claimed in claim 1 wherein said load carrying means is mounted on said wheeled cart member so that said mast section is positioned at an angle of from forty to sixty degrees from the vertical when in the load carrying position.

6. A hand truck as claimed in claim 5 wherein said fork portion of said load carrying means is substantially horizontal when said load carrying means is in the load/unload position.

7. A hand truck as claimed in claim 1 including a generally horizontal platform mounted on the rear end of said cart member frame and extending rearwardly therefrom so that an operator may stand thereon.

8. A power assisted hand truck for transporting a plurality of logs from place to place which comprises:

a generally rectangular frame member having a front end and a rear end;

a pair of powered drive wheels rotatably mounted on said rear end of said frame member;

a pair of steerable wheels pivotally mounted on said front end of said frame member;

motive power means mounted on said frame member adjacent said rear end;

drive means connecting said motive power means to said drive wheels;

log carrying means having an upwardly inclined mast section and a fork portion mounted perpendicular thereto at the lower end of said mast section;

said log carrying means being pivotally mounted adjacent the junction of said mast section and fork portion on the front end of said frame member for front to rear movement relative to said frame member;

handle means formed at the upper end of said mast section for pivotally moving said log carrying means from an upright loading position to a reclining position for transporting a load of logs;

a generally horizontal platform mounted on the rear end of said frame member and extending rearwardly therefrom so that an operator may stand thereon;

a steering handle mounted at the upper portion of said frame member and operatively connected to said steerable wheels mounted at the front end of said frame member; and control means mounted with said steering handle at the rear of said hand truck for selectively applying said motive power means to said drive wheels so that an operator standing on said platform may operate said log carrying hand truck for transporting a load of logs from place to place.

9. A hand truck as claimed in claim 8 wherein said steerable wheels and log carrying means are pivotally mounted for side to side tilting as said steerable wheels pass over uneven ground whereby a load carried on said fork portion will clear uneven ground.

10. A light weight powered hand truck for transporting heavy and awkward loads up steep inclines which comprises in combination:

a generally rectangular frame member having a front end and a rear end;

a pair of powered drive wheels rotatably mounted on said rear end of said frame member;

a pair of steerable wheels individually (pivotally) mounted on said front end of said frame member for rotary motion about horizontal axes and pivotal motion about vertical axes;

motive power means mounted on said frame member adjacent said rear end;

drive means connecting said motive power means to said drive wheels including a transmission having at least two forward and one reverse positions;

load carrying means having an upwardly inclined mast section and a fork portion mounted perpendicular thereto at the lower end of said mast section;

said load carrying means being pivotally mounted adjacent the junction of said mast section and fork portion on the front end of said frame member for movement from a vertical to a reclined position;

handle means formed at the upper end of said mast section for pivotally moving said load carrying means from an upright loading position to a reclining position for transporting a load;

steering handle means mounted at the upper portion of said frame member and operatively connected to said pair of steerable wheels mounted at the front of said frame member; and control means for selectively applying said motive power means to said drive wheels for transporting a load up a steep incline.

11. A powered hand truck as claimed in claim 10 wherein said inclined mast section of said load carrying means when in the load transporting position forms an angle of from forty to sixty degrees with said rectangular frame member.

12. A powered hand truck as claimed in claim 10 wherein one of said transmission forward positions will power said hand truck up an incline of at least twenty degrees.

13. A powered hand truck as claimed in claim 10 wherein one of said transmission forward positions has a reduction ratio of between 30:1 and 60:1 and the other forward position has a reduction ratio of between 5:1 and 10:1.

* * * * *